United States Patent [19]

Shibata et al.

[11] 4,069,274
[45] Jan. 17, 1978

[54] THERMOSETTING ACRYLIC POWDER COATING COMPOSITIONS

[75] Inventors: Minoru Shibata; Naozumi Iwasawa; Tadashi Watanabe; Ichiro Yoshihara, all of Hiratsuka, Japan

[73] Assignee: Kansai Paint Company, Limited, Japan

[21] Appl. No.: 598,946

[22] Filed: July 25, 1975

[30] Foreign Application Priority Data

July 31, 1974 Japan .................................. 49-87686

[51] Int. Cl.² ............................................. C08L 63/00
[52] U.S. Cl. ................................. 260/836; 260/830 R; 260/835; 260/837 R
[58] Field of Search ........................ 260/836, 876, 835

[56] References Cited

U.S. PATENT DOCUMENTS

| | | | |
|---|---|---|---|
| 3,317,635 | 5/1967 | Osmond | 260/836 |
| 3,514,500 | 5/1970 | Osmond | 260/874 |
| 3,652,472 | 3/1972 | Clarke | 260/836 |
| 3,702,836 | 11/1972 | Walbridge | 260/836 |
| 3,880,946 | 4/1975 | Labana | 260/830 R |
| 3,880,947 | 4/1975 | Labana | 260/830 P |
| 3,888,945 | 6/1975 | Arndt | 260/836 |
| 3,925,295 | 12/1975 | Osborn | 260/34.2 |

OTHER PUBLICATIONS

Powder Coating: Detroit Society for Paint Technology, Journal of Paint Technology, vol. 44, No. 565, Feb. 1972 pp. 30-37.

*Primary Examiner*—Paul Lieberman
*Attorney, Agent, or Firm*—Larson, Taylor and Hinds

[57] ABSTRACT

A thermosetting powder coating composition comprising:

A. a functional glycidyl group-containing graft copolymer of
   i. 10 to 40 percent of a linear polyester having a number average molecular weight of 600 to 3,000 and containing one terminal carboxyl group and
   ii. 60 to 90 percent of acrylic copolymer of ii-a) 6.5 to 60 percent of at least one of glycidyl esters having the formula

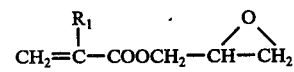

wherein $R_1$ is hydrogen or methyl, ii-b) 10 to 93.5 percent of at least one of acrylic monomers having the formula $CH_2=C(R_2)COOR_3$ wherein $R_2$ is hydrogen or methyl and $R_3$ is alkyl having 1 to 14 carbon atoms, cyclohexyl or hydroxyalkyl having 1 to 4 carbon atoms, and ii-c) 0 to 65 percent of additional monomers selected from the group consisting of acrylonitrile, methacrylonitrile and styrenes having the formula

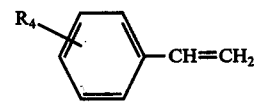

wherein $R_4$ is hydrogen or alkyl having 1 to 4 carbon atoms, said graft copolymer having a softening point of 70° to 110° C and a number average molecular weight of 2,000 to 30,000 and containing glycidyl group in an amount of 0.35 to 2.35 moles per kilogram of the graft copolymer; and B. at least one of polycarboxylic acids and anhydrides thereof in an amount of 0.6 to 1.2 moles in terms of carboxyl group per mole of the glycidyl group contained in the graft copolymer.

14 Claims, No Drawings

THERMOSETTING ACRYLIC POWDER COATING COMPOSITIONS

This invention relates to thermosetting powder coating compositions.

With ever increasing severity of pollution of air, water and the like, powder coating compositions are introduced into use which are almost unlikely to cause pollution problems.

Presently, epoxy resin or vinyl chloride resin is chiefly used as the resin component of powder coating compositions. Because of poor resistance to weather, however, powder coating compositions of the epoxy resin type are not usable out-of-doors, whilst those of the vinyl chloride resin type which are thermoplastic are inferior in their resistance to heat and to solvents and therefore have limited usefulness.

In order to overcome these problems, various powder coating compositions of the acrylic resin type have been recently proposed which contain glycidyl group as a functional group.

With such acrylic resin type powder coating composition containing functional glycidyl groups, efforts are made to ingeniously maintain the thermal flowability, cross-linking reaction velocity and softening point of the resin in balance with one another so that the composition exhibits good storage stability and gives smooth coatings having high resistance to solvents and to weather.

To ensure such balance, there arises the necessity to accurately determine the kind of the acrylate or methacrylate to be used, the amount thereof, the polymerization degree and the amount of the monomer containing the functional group to be used. However, even with the optimum combination of these factors, the coating composition is prone to blocking when applied or stored in an environment in which the ambient temperature is likely to exceed 35° C. The term "blocking" means the phenomenon in which particles of the coating composition cohere one another during storage. This objection is avoidable when the composition is adapted to have an elevated softening point at the sacrifice of the smoothness of the coating to be prepared therefrom or, otherwise, by providing cooling means for the containers for storing and recovering the coating composition. In the former case, the powder coating composition of the thermosetting acrylic resin type is no longer applicable to decorative surface finish for which the coating composition is chiefly intended to use, whereas the latter case entails higher equipment cost and operation cost and is unfavorable.

Furthermore, powder coating compositions of the acrylic resin type require baking at high temperatures of at least 180° C, if it is desired to obtain a coating which is superior in mechanical properties such as resistance to impact, Erichsen test and flexural strength, because lower baking temperatures not only impair the mechanical properties of the coating but also reduce its resistance to weather, solvents and heat.

For use in decorative surface finishing, powder coating compositions, like usual solvent-type coating compositions, should be applicable to a small thickness of about 25 to 50 microns for the sake of economy, but conventional thermosetting powder coating compositions of the acrylic resin type involve difficulties in giving thin coatings, because they exhibit a high melt viscosity when applied for coating and display low flowability when heated for fusion. Although such coating compositions may be adapted to form thin coatings by reducing their curability to render them more flowable in molten state, this is not desirable since the resulting coatings will be inferior in physical properties, solvent resistance, etc. On the other hand, the coating composition can be made to form thin coatings when reduced in its softening point and thereby lowered in its melt viscosity, but the composition will then have the disadvantage that the particles cohere together during storage, resulting in reduced resistance to blocking. Such composition is therefore similarly undesirable.

Accordingly, an object of this invention is to provide an improved powder coating composition which is free of the foregoing drawbacks of known acrylic powder coating compositions.

Another object of this invention is to provide a powder coating composition capable of giving coatings which are excellent in mechanical strength and in physical properties even when baked at low temperatures.

Another object of this invention is to provide a powder coating composition capable of giving smooth, glossy coatings for decorative purposes free from undesired blocking, even when applied or stored in a hot environment.

Still another object of this invention is to provide a powder coating composition which has a low melt viscosity and good flowability and which is therefore capable of readily forming smooth, glossy and yet thin coatings.

The present invention provides a thermosetting powder coating composition which comprises:

A. a functional glycidyl group-containing graft copolymer of
 i. 10 to 40 percent by weight of a linear polyester having a number average molecular weight of 600 to 3,000 and containing one terminal carboxyl group, and
 ii. 60 to 90 percent by weight of acrylic copolymer of
  ii-a. 6.5 to 60 percent by weight of at least one glycidyl ester having the formula

wherein $R_1$ is hydrogen or methyl,
  ii-b. 10 to 93.5 percent by weight of at least one acrylic compound having the formula

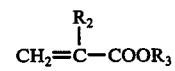

wherein $R_2$ is hydrogen or methyl and $R_3$ is alkyl having 1 to 14 carbon atoms, cyclohexyl or hydroxyalkyl having 1 to 4 carbon atoms, and
  ii-c. 0 to 65 percent by weight of at least one of additional monomers selected from the group consisting of acrylonitrile, methacrylonitrile and styrenes represented by the formula

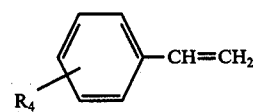

wherein $R_4$ is hydrogen or alkyl having 1 to 4 carbon atoms, said graft copolymer having a softening point of 70° to 110° C and a number average molecular weight of 2,000 to 30,000 and containing glycidyl group in an amount of 0.35 to 2.35 moles per kilogram of the graft copolymer; and B. at least one polycarboxylic acids and anhydrides thereof in an amount of 0.6 to 1.2 moles in terms of carboxyl group per mole of the glycidyl group contained in the graft copolymer.

The first advantage of the coating composition of this invention is that when baked for 30 minutes at a temperature of 150° C which is much lower than is the case with conventional acrylic powder coating compositions, the composition gives a coating having mechanical properties such as impact resistance, Erichsen test and flexural strength, which are comparable to those resulting from epoxy resin powder coating compositions which are the most excellent of presently available powder coating compositions. Moreover, coating prepared from the present composition are in no way inferior to usual powder coating compositions of the thermosetting acrylic resin type in respect of resistance to weather, solvents and heat.

The second advantage of the present coating composition is that the above-mentioned unique graft copolymer of polyester and acrylic copolymer used therein copolymer of polyester and acrylic copolymer used therein enables the composition to remain in the form of fine particles free of blocking so as to be applicable to electrostatic coating or fluidized bed coating even under the severe operation condition of 35° to 40° C as when it is used during summer, with the result that the composition can give smooth and glossy surface finish coatings.

It is indeed surprising that the above-specified graft copolymer of linear polyester and acrylic copolymer, although containing 10 to 40 percent by weight of polyester grafted on to the acrylic copolymer, has almost as high a softening point as ungrafted acrylic copolymers and possesses a greatly reduced melt viscosity when heated.

The high softening point makes it less likely for the coating composition to undergo blocking during storage or coating operation, so that the composition has high resistance to blocking and good amenability to coating operation.

On the other hand, the low melt viscosity of the composition when it is applied for coating ensures good thermal flowability to give a smooth surface finish.

The third advantage of the coating composition of this invention is that because of its low melt viscosity and good thermal flowability during the formation of coating, the composition is capable of giving smooth and glossy coatings having small thicknesses of 25 to 50 μ while retaining the desired curability and blocking resistance.

Thus these various advantages of the invention are attributable to the use of the specified graft copolymer of linear polyester and acrylic copolymer.

With this invention, the polyester (i) constituting the above-identified graft copolymer must have a number average molecular weight of 600 to 3,000 and contain one carboxyl group only at one end of the molecule. With a number average molecular weight of less than 600, the polyester has a poor plasticizing ability and is ineffective in greatly reducing the melt viscosity, impairing the smoothness and physical properties of the resulting coating. With a number average molecular weight of more than 3,000, the coating composition has a markedly reduced softening point and poor blocking resistance. Preferable number average molecular weight is in the range of 1,000 to 2,000.

The method of preparing the linear polyester (i) having one terminal carboxyl group is in no way limitative in this invention but merely has a secondary significance in this invention. Most advantageously, however, it is prepared by condensing a monohydroxymonocarboxylic acid or a mixture of the acid and monocarboxylic acid to obtain a linear polyester (i) having one free terminal carboxyl group. Useful monohydroxymonocarboxylic acids are aliphatic monocarboxylic acids having 2 to 18 carbon atoms and having one terminal carboxyl group and one hydroxyl group in the molecule. Preferable examples are 12-hydroxystearic acid, ricinoleic acid, lactic acid, etc., among which especially preferable are 12-hydroxystearic acid and ricinoleic acid. The monohydroxymonocarboxylic acids can be used alone or in admixture with one another. The monohydroxymonocarboxylic acid can be employed in admixture with a monocarboxylic acid, if desired, in order to adjust the molecular weight of the resultant linear polyester. Usable monocarboxylic acids are aliphatic monocarboxylic acids having 2 to 18 carbon atoms and aromatic monocarboxylic acids represented by the formula

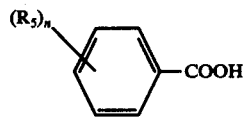

wherein $R_5$ is alkyl having 1 to 4 carbon atoms and n is 0 or an integer of 1 or 2. Preferable examples of the former are acetic acid, caproic acid, caprylic acid, capric acid, lauric acid, myristic acid, palmitic acid, stearic acid, etc. Preferable examples of the latter are benzoic acid, p-tert-butyl benzoic acid, etc. Especially preferable monocarboxylic acids are palmitic acid, stearic acid and p-tert-butyl benzoic acid. One or more of the monocarboxylic acids can be used. The monohydroxymonocarboxylic acid is subjected, singly or as admixed with the monocarboxylic acid, to condensation reaction. When the monocarboxylic acid is used, the amount thereof is up to 20 mole %, preferably 10 to 20 mole %, based on the monohydroxymonocarboxylic acid. The condensation reaction is conducted in a conventional manner in the presence or absence of catalyst and with heating. Suitable catalysts are, for example, sulfuric acid, dimethyl sulfuric acid, methanesulfonic acid, etc. Generally, the condensation temperature is about 130° to about 170° C. The condensation reaction yields a linear polyester having one carboxyl group at the end of the molecule.

Another component of the graft copolymer includes acrylic copolymers (ii) of two components (ii-a) and (ii-b) and of three components (ii-a), (ii-b) and (ii-c). The former is a copolymer of glycidyl ester (ii-a) represented by the formula

wherein $R_1$ is hydrogen or methyl and acrylic monomer (ii-b) having the formula

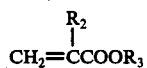

wherein $R_2$ is hydrogen or methyl and $R_3$ is alkyl having 1 to 14 carbon atoms, cyclohexyl or hydroxyalkyl having 1 to 4 carbon atoms. The latter is a copolymer of the above two components (ii-a) and (ii-b) and additional monomer (ii-c) including acrylonitrile, methacrylonitrile and styrenes having the formula

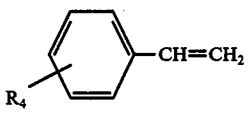

wherein $R_4$ is hydrogen or alkyl having 1 to 4 carbon atoms. The glycidyl esters (ii-a) include glycidyl acrylate and glycidyl methacrylate. The acrylic monomers (ii-b) include esters of acrylic acid and methacrylic acid. Examples thereof are alkyl ($C_1$ to $C_{14}$) esters such as methyl acrylate, ethyl acrylate, propyl acrylate, n-butyl acrylate, iso-butyl acrylate, t-butyl acrylate, 2-ethylhexyl acrylate, lauryl acrylate, methyl methacrylate, ethyl methacrylate, propyl methacrylate, n-butyl methacrylate, iso-butyl methacrylate, t-butyl methacrylate, 2-ethylhexyl methacrylate, lauryl methacrylate, etc.; cyclohexyl acrylate and cyclohexyl methacrylate; and hydroxyalkyl esters such as 2-hydroxyethyl acrylate, 2-hydroxyethyl methacrylate, 2-hydroxypropyl acrylate, 2-hydroxypropyl methacrylate. Preferable acrylic monomers are methyl acrylate, ethyl acrylate, cyclohexyl acrylate, methyl methacrylate, ethyl methacrylate, n-butyl methacrylate, iso-butyl methacrylate, 2-ethylhexyl methacrylate, 2-hydroxyethyl methacrylate and lauryl methacrylate. They may be used alone or in admixture with one another. The additional monomer (ii-c), which is usable as required, is acrylonitrile, methacrylonitrile or styrenes having the above formula. Examples of the styrenes are styrene, vinyl toluene, etc. They can be used singly or in admixture with one another.

The acrylic copolymer (ii) to be used in the invention contains 6.5 to 60% by weight of glycidyl ester (ii-a), 10 to 93.5% by weight of acrylic monomer (ii-b) and 0 to 65% by weight of additional monomer (ii-c). When the proportion of glycidyl ester (ii-a) is less than 6.5% by weight, insufficient cross linking will result, failing to impart satisfactory solvent resistance and mechanical strength to the resulting coating, whereas proportions more than 60% by weight impair surface smoothness of the coating. The acrylic monomer (ii-b) should be contained in the copolymer (ii) in a proportion of at least 10% by weight to ensure the adhesion of the resulting coating to the substrate. The additional monomer is used, as required, in an amount of up to 65% by weight in order to further improve resistance to blocking of the resulting composition. With more than 65% by weight of the additional monomer, the resulting coating will be poor in surface smoothness. Thus the acrylic copolymer to be used in the invention includes a copolymer comprising 6.5 to 60%, preferably 15 to 60%, by weight of glycidyl ester (ii-a) and 40 to 93.5%, preferably 40 to 85%, by weight of acrylic monomer (ii-b) and a copolymer comprising 6.5 to 60%, preferably 15 to 50%, by weight of glycidyl ester (ii-a), at least 10%, preferably 20 to 80%, by weight of acrylic monomer (ii-b) and up to 65%, preferably 5 to 30% by weight of additional monomer (ii-c).

The acrylic copolymer (ii) can be obtained by copolymerizing the glycidyl ester (ii-a) and acrylic monomer (ii-b) and, when required, additional monomer (ii-c) in a manner conventional in the art.

Applicable are various polymerization methods, such for example as solution polymerization, block polymerization, emulsion polymerization, suspension polymerization, etc., among which solution polymerization is most preferable. The polymerization can be conducted in the presence of a radical initiator, such as azobisisobutyronitrile, azobisdimethylvaleronitrile, azobiscyclohexanecarbonitrile and like azo compounds, and benzoyl peroxide, t-butylhydroperoxide, t-butyl peroxybenzoate, di-t-butyl peroxide, cumenehydroperoxide, dicumyl peroxide, lauroyl peroxide, t-butyl peroxyoctate and like organic peroxides. For solution polymerization are employable various organic solvents such as aliphatic or aromatic hydrocarbons. The solution polymerization can preferably be conducted under reflux termparature.

The glycidyl group-containing graft copolymer (A) to be used in the invention can be obtained by subjecting to graft copolymerization the above two components, namely linear polyester (i) having terminal carboxyl group and glycidyl group-containing acrylic copolymer (ii). By the graft copolymerization the glycidyl group contained in the acrylic copolymer (ii) reacts with the carboxyl group in the polyester (i) to produce the desired graft copolymer. The graft copolymer must have a softening point of 70° to 110° C and a number average molecular weight of 2,000 to 30,000 and contain glycidyl group in an amount of 0.35 to 2.35 moles per kilogram of the graft copolymer. If the softening point is below 70° C, the resistance to blocking of the resulting coating composition will be poor. When the softening pont is higher than 110° C, the resulting coating will be poor in surface smoothness. With less than 2,000 in number average molecular weight of the graft copolymer, the coating obtained has low mechanical strength and solvent resistance while the coating composition has inferior resistance to blocking. On the other hand, a molecular weight higher than 30,000 gives no additional effect on the properties of the coating composition as well as of the coating but increases the melt viscosity of the coating composition, making it impossible to obtain a smooth coating. Preferable number average molecular weight of the graft copolymer is 4,000 to 20,000. When the amount of glycidyl group contained in the graft copolymer is less than 0.35 mole per kilogram of the copolymer, the resulting coating composition is insufficient in curability to form the coating which is poor in physical properties, particularly in solvent resistance. The amount of glycidyl group more than 2.35 moles per kilogram of the copolymer impairs thermal flowability due to excessive order of curability, resulting in the coating having poor surface smoothness. Preferable amount of the glycidyl group is in the range of 0.50 to 1.70 moles per kilogram of the graft copolymer.

The proportions of the components (i) and (ii) to be copolymerized into the graft copolymer are critical and must be 10 to 40% of linear polyester and 60 to 90% by weight of acrylic copolymer. If the amount of the linear polyester is less than 10% by weight, it is impossible to fully ensure the effect contemplated by this invention.

More specifically, as will be apparent from Composition No. 6 in the example given later, a graft copolymer (GP-6) containing about 5% by weight of the polyester is not particularly distinguishable from ungrafted copolymers, whereas those containing at least 10% by weight of polyester have an outstanding effect.

This will be seen from Table 1 given below which shows the softening points and melt viscosities at 140° C of copolymers containing varying amounts of polyester.

Table 1

| Proportion of polyester in the copolymer (wt. %) | Melt viscosity (Poises) | Softening point (° C) |
|---|---|---|
| 0 | 5,800 | 84 |
| 5 | 5,450 | 88 |
| 10 | 1,450 | 89 |
| 40 | 1,250 | 81 |
| 50 | 1,200 | 65 |

Note:
The copolymers are prepared in the same manner as graft copolymer-4 given later, except that the amount of polyester-4 is varied.

Evidently, the table shows that use of 10 to 40% by weight of polyester for graft copolymerization remarkably reduces the melt viscosity without permitting a noticeable reduction in the softening point. The table further reveals that use of more than 40% by weight of polyester is not noticeably effective in reducing the melt viscosity, while markedly lowering the softening point to reduce the resistance to blocking of the coating composition (see Composition No. 10 in the example given later). Preferably the proportion of polyester to be copolymerized is about 15 to 30% by weight.

Further the proportion of polyester and acrylic copolymer should be determined so as to satisfy the following equation:

$$0.35 \geq \left( \frac{A}{B} - \frac{C \times D}{56100} \right) \div \frac{E}{1000} \geq 2.35$$

wherein A is the weight in terms of grams of glycidyl ester contained in 1,000 grams of acrylic copolymer, B is molecular weight of glycidyl ester, C is the weight in terms of grams of polyester used relative to 1,000 grams of acrylic copolymer, D is the acid value of polyester, and E is the weight in terms of grams of graft copolymer obtained.

The graft copolymer can be prepared by block polymerization, solution polymerization, suspension polymerization, emulsion polymerization, etc., among which most preferable is solution polymerization.

In the solution polymerization are employable various organic solvents such as aliphatic hydrocarbons, aromatic hydrocarbons, etc. The solution polymerization can be conducted in the presence of catalysts. Examples thereof are trimethyl amine, triethyl amine, dimethylaminoethanol, dimethyl coconut amine and like tertiary amines, tetraethyl ammonium bromide, trimethyl benzyl ammonium chloride and like quaternary ammonium salts, etc. The solution polymerization reaction is usually carried out under reflux temperature until the acid value of the product reduces to a level not higher than 5.

The powder coating composition of this invention incorporates the graft copolymer described above and at least one of polycarboxylic acids and anhydrides thereof. Useful polycarboxylic acids are aliphatic, alicyclic and aromatic polycarboxylic acids which are known as curing agents for acrylic resins containing a functional glycidyl group. More specific examples of polycarboxylic acids are aliphatic polycarboxylic acids such as adipic acid, azelaic acid, sebacic acid, dodecanedicarboxylic acid, fumaric acid, maleic acid, succinic acid, tricarballylic acid, etc.; alicyclic polycarboxylic acids such as tetrahydrophthalic acid, hexahydrophthalic acid, etc.; and aromatic polycarboxylic acids such as phthalic acid, isophthalic acid, terephthalic acid, trimellitic acid, pyromellitic acid, etc. The anhydrides of such polycarboxylic acids are similarly usable. The polycarboxylic acids and anhydrides thereof are used singly or at least two of them are usable in admixture.

To prepare the powder coating composition of this invention, at least one of the above polycarboxylic acids and anhydrides thereof is used in an amount of 0.6 to 1.2 moles in terms of carboxyl group per mole of the glycidyl group contained in the graft copolymer. Lesser amounts lead to insufficient curing and therefore to lower mechanical strength and solvent resistance of the resulting coating, while excess amounts result in reduced surface smoothness and poor physical properties of the coating.

The powder coating composition of this invention may further incorporate organic and inorganic pigments, flowing agent, curing catalyst, antistatic agent, etc. which are generally used for coating compositions. Employable as the curing catalysts are, for example, tertiary-amines, quaternary ammonium salts such as trimethylbenzyl ammonium bromide, organic tin compounds such as triphenyl tin chloride and dibutyl tin laurate.

The powder coating composition can be prepared by any conventional method, for example, by blending the ingredients in molten state or by formulating the ingredients into a solution and thereafter removing the solvent.

For a better understanding of the invention examples for preparing linear polyesters (A)-(i), graft copolymers (A) and coating compositions are given below.

Preparation of polyester

1. Polyester-1 (PE-1)

A 3,000 g quantity of 12-hydroxystearic acid, 150 g of toluene and 5 g of methanesulfonic acid serving as a catalyst are placed into a 5-liter reactor equipped with a thermometer, a water separator and a stirrer, and the mixture is subjected to dehydration condensation at 150° C for 4 hours to prepare a polyester in the form of a viscous liquid and having an acid value of 32 and a molecular weight of about 1,750. The polyester will be hereinafter referred to as "polyester-1" or "PE-1".

2. Polyester-2 (PE-2)

Exactly the same procedure as in the case of polyester-1 is followed except that the dehydration condensation is effected for 1.5 hours to obtain a polyester (hereinafter referred to as "polyester-2" or "PE-2") in the form of a viscous liquid and having an acid value of 56 and a molecular weight of about 1,000.

3. Polyester-3 (PE-3)

Exactly the same procedure as in the case of polyester-1 is followed except that the dehydration condensation is effected for 10 hours to obtain a polyester (hereinafter referred to as "polyester-3" or "PE-3") in the form of a viscous liquid and having an acid value of 20 and a molecular weight of about 2,800.

4. Polyester-4 (PE-4)

Exactly the same procedure as in the case of polyester-1 is followed except that the dehydration condensation is effected for 3 hours using 2,800 g of ricinoleic acid and 200 g of t-butylbenzoic acid in place of 3,000 g of 12-hydroxystearic acid to obtain a polyester (hereinafter referred to as "polyester-4" or "PE-4") in the form of a viscous liquid and having an acid value of 37.4 and a molecular weight of about 1,500.

5. Polyester-5 (PE-5)

Exactly the same procedure as in the case of polyester-1 is followed except that the dehydration condensation is effected for 2 hours using 2,500 g of 12-hydroxystearic acid and 500 g of lactic acid to obtain a polyester (hereinafter referred to as "polyester-5" or "PE-5") having an acid value of 80 and a molecular weight of about 700.

6. Polyester-6 (PE-6)

Exactly the same procedure as in the case of polyester-1 is followed except that the dehydration condensation is effected for 3.5 hours using 2,500 g of 12-hydroxystearic acid and 400 g of coconut oil fatty acid to obtain a polyester (hereinafter referred to as "polyester-6" or "PE-6") in the form of a viscous liquid and having an acid value of 35 and a molecular weight of about 1,600.

7. Polyester-7 (PE-7)

Exactly the same procedure as in the case of polyester-1 is followed except that the dehydration condensation is effected for 1.5 hours using 1,500 g of 12-hydroxystearic acid and 1,500 g of lactic acid to obtain a polyester (hereinafter referred to as "polyester-7" or "PE-7") in the form of a viscous liquid and having an acid value of 150 and a molecular weight of about 375.

8. Polyester-8 (PE-8)

Exactly the same procedure as in the case of polyester-1 is followed except that the dehydration condensation is effected for 15 hours to obtain a polyester (hereinafter referred to as "polyester-8" or "PE-8") in the form of a viscous liquid and having an acid value of 15 and a molecular weight of about 3,740.

Preparation of graft copolymer

1. Graft copolymer-1

A 1,000 g quantity of toluene is placed into a 5-liter, four-necked flask equpped with a reflux condenser, a stirrer and a dropping funnel and is heated to reflux temperature in nitrogen atmosphere. A mixture of 150 g of methyl methacrylate, 150 g of n-butyl methacrylate, 200 g of styrene, 196 g of glycidyl methacrylate and 30 g of azobisisobutyronitrile placed in a dropping funnel is added dropwise over a period of 3 hours to the toluene maintained at the same temperature. Further at the same temperature, a mixture of 3 g of azobisisobutyronitrile and 30 g of ethyl acetate is added dropwise to the resulting solution three times at an interval of 1 hour. (The catalyst thus added is hereinafter referred to as an "additional catalyst"). The mixture is heated under reflux for 2 hours to effect copolymerization. To the resulting copolymer solution are added 327 g of polyester-1 and 0.3 g of triethylamine, and the mixture is maintained under reflux for 4 hours. The acid value of the resulting graft copolymer is 0.2. Then the condenser is changed into a concurrent condenser, and the mixture is slowly heated to 150° C while permitting the solvent and unreacted monomers to run off from the flask. After about 60% of the solvent charged in has been drawn off, the interior of the flask is maintained at 170° C at a reduced pressure of 30 mm Hg for 20 minutes, and the contents are then placed into a stainless steel vat and solidified by cooling to prepare a graft copolymer-1 (GP-1).

2 - 19. Graft copolymers - 2 to 19.

In exactly the same manner as above, graft copolymers - 2 to 19 (GP-2 to GP - 19) are prepared using the specified amounts of materials listed in Table 2. Table 3 shows the compositions and properties of the graft copolymers obtained.

Table 2

| Graft copolymer obtained | Solvent | Copolymn. Component (ii-a) (g) | Copolymn. Component (ii-b) (g) | Copolymn. Component (ii-c) (g) | Polymerization initiator (g) | Additional catalyst (g) | Graft copolymn. Polyester (i) (g) | Catalyst (g) |
|---|---|---|---|---|---|---|---|---|
| GP-2 | Toluene 1,000 | Glycidyl methacrylate 73 | 2-Hydroxyethylacrylate 50<br>2-Ethylhexyl acrylate 150<br>Cyclohexyl methacrylate 400<br>Lauryl methacrylate 150 | Styrene 150<br>Vinyltoluene 150 | Benzoyl peroxide 30 | Benzoyl peroxide 3 | PE-2 113 | — |
| GP-3 | Ethyl acetate 1,000 | " 187 | Ethyl methacrylate 150<br>n-Butyl acrylate 150 | Styrene 200<br>Acrylonitrile 80 | " 8 | " 3 | PE-3 241 | Dimethyl coconut amine 0.5 |
| GP-4 | Toluene 1,000 | Glycidyl acrylate 271 | 2-Ethylhexyl methacrylate | Styrene 290 | t-Butyl peroxyoctate | t-Butyl peroxyoctate | PE-4 189 | Dimethyl coconut amine |

Table 2-continued

| Graft copolymer obtained | Solvent | Copolymn. Component (ii-a) (g) | Component (ii-b) (g) | Component (ii-c) (g) | Polymerization initiator (g) | Additional catalyst (g) | Graft copolymn. Polyester (i) (g) | Catalyst (g) |
|---|---|---|---|---|---|---|---|---|
| GP-5 | Butyl acetate 1,000 | Glycidyl methacrylate 323 | n-Butyl acrylate 175 | 150 500 | 30 " 70 | 3 " 6 | PE-5 264 | 0.5 " |
| GP-6 | Toluene 1,000 | " 236 | Ethyl methacrylate 600 n-Butyl methacrylate 140 | — | " 25 | " 3 | PE-6 47 | " 0.1 |
| GP-7 | Toluene 1,000 | " 220 | Ethyl methacrylate 600 | — | " " | " " | PE-6 190 | " 0.3 |
| GP-8 | " " | " 233 | " 500 | — | " " | " " | PE-6 283 | " 0.5 |
| GP-9 | Toluene 1,000 | Glycidyl methacrylate 240 | Ethyl methacrylate 410 | — | t-Butyl peroxyoctate 25 | t-Butyl peroxyoctate 3 | PE-6 365 | Tetraethyl ammonium bromide 0.3 |
| GP-10 | " " | " 252 | Ethyl methacrylate 200 Methyl methacrylate 100 | — | " " | " " | PE-6 474 | " 0.5 |
| GP-11 | " " | " 273 | Ethyl methacrylate 600 | — | " " | " " | PE-7 163 | " 0.1 |
| GP-12 | " " | " 210 | Ethyl methacrylate 600 | — | " " | " " | PE-8 195 | " 0.2 |
| GP-13 | Toluene 1,000 | Glycidyl methacrylate 41 | Ethyl methacrylate 600 2-Hydroxymethyl methacrylate 150 | — | t-Butyl peroxyoctate 25 | t-Butyl peroxyoctate 3 | PE-6 189 | Tetraethyl ammonium bromide 0.2 |
| GP-14 | " " | " 420 | Ethyl methacrylate 200 Methyl methacrylate 200 | — | " 25 | " 3 | PE-6 190 | " " |
| GP-15 | " " | " 220 | Ethyl methacrylate 400 Methyl methacrylate 200 | — | " 100 | " 10 | PE-6 190 | " " |
| GP-16 | Ethyl-acetate 1,000 | Glycidyl methacrylate 220 | Ethyl methacrylate 400 n-Butyl methacrylate 200 | — | t-Butyl peroxyoctate 4 | t-Butyl peroxyoctate 3 | PE-6 190 | Tetraethyl ammonium bromide 0.2 |
| GP-17 | Toluene 1,000 | " 220 | Ethyl methacrylate 300 n-Butyl acrylate 300 | — | " 25 | " " | PE-6 190 | " " |
| GP-18 | " " | " 220 | Methyl methacrylate 600 | — | " " | " " | PE-6 190 | " " |
| GP-19 | " " | " 240 | n-Butyl acrylate 50 | Styrene 150 Vinyl toluene | " " | " " | PE-6 365 | " 0.4 |

Table 2-continued

| Graft copolymer obtained | Solvent | Copolymn. Component (ii-a) (g) | Component (ii-b) (g) | Component (ii-c) (g) | Polymerization initiator (g) | Additional catalyst (g) | Graft copolymn. Polyester (i) (g) | Catalyst (g) |
| --- | --- | --- | --- | --- | --- | --- | --- | --- |
| | | | | 210 | | | | |

Table 3

| Graft copolymer | Polyester component (i) (wt. %) | Component (ii-a) (wt. %) | Component (ii-b) (wt. %) | Component (ii-c) (wt. %) | Molecular weight | Softening point (° C) | Component (ii-a) reacted with carboxyl group of polyester (i) (wt. %) | Moles of glycidyl group contained in 100 g of graft copolymer |
| --- | --- | --- | --- | --- | --- | --- | --- | --- |
| GP-1 | 30.4 | 17.0 | 30.1 | 20.1 | 5,500 | 87 | 2.4 | 1.20 |
| GP-2 | 10.4 | 5.3 | 55.2 | 27.6 | 8,300 | 89 | 1.5 | 0.37 |
| GP-3 | 20.8 | 15.1 | 38.9 | 24.2 | 25,000 | 105 | 1.0 | 1.06 |
| GP-4 | 21.0 | 28.1 | 16.7 | 32.2 | 5,200 | 81 | 2.0 | 2.19 |
| GP-5 | 20.9 | 21.4 | 13.9 | 39.6 | 2,600 | 72 | 4.2 | 1.51 |
| GP-6 | 4.6 | 22.6 | 72.4 | — | 6,300 | 87 | 0.4 | 1.61 |
| GP-7 | 18.8 | 20.3 | 59.4 | — | 6,600 | 87 | 1.5 | 1.45 |
| GP-8 | 27.9 | 20.5 | 49.3 | — | 6,700 | 83 | 2.3 | 1.46 |
| GP-9 | 36.0 | 20.7 | 40.4 | — | 6,800 | 82 | 2.9 | 1.48 |
| GP-10 | 46.2 | 20.9 | 29.2 | — | 6,950 | 66 | 3.7 | 1.49 |
| GP-11 | 15.7 | 20.5 | 57.9 | — | 6,300 | 84 | 4.9 | 1.44 |
| GP-12 | 19.4 | 20.3 | 59.6 | — | 6,700 | 65 | 0.7 | 1.43 |
| GP-13 | 19.3 | 2.6 | 76.5 | — | 6,650 | 92 | 1.6 | 0.19 |
| GP-14 | 18.8 | 40.1 | 39.6 | — | 6,700 | 83 | 1.5 | 2.86 |
| GP-15 | 18.8 | 20.3 | 69.7 | — | 1,600 | 73 | 1.5 | 1.45 |
| GP-16 | 18.8 | 20.3 | 69.7 | — | 35,000 | 101 | 1.5 | 1.45 |
| GP-17 | 18.8 | 20.3 | 69.7 | — | 6,650 | 63 | 1.5 | 1.45 |
| GP-18 | 18.8 | 20.3 | 69.7 | — | 6,750 | 124 | 1.5 | 1.45 |
| GP-19 | 36.0 | 20.7 | 5.2 | 35.2 | 7,200 | 75 | 2.9 | 1.48 |

Preparation of powder coating compositions

Powder coating compositions are prepared, using the ingredients given in Table 4 below in the listed amounts.

Compositions Nos. 1 to 5, 7 to 9 and 21 are prepared according to this invention. The other compositions are prepared for comparison.

The ingredients are kneaded with hot rolls at 110° C for 30 minutes, and the mixture is solidified by cooling, roughly crushed, then pulverized and screened to obtain fine particles passing through 150-mesh sieves. The fine powder is then electrostatically applied to a 0.8-mm thick mild steel sheet treated with zinc phosphate and the coated sheet is heated at 150° C for 30 minutes for curing to prepare a test panel. The coating has a thickness of 40 ± 5 μ.

Table 4

| Comp. No. | Graft copolymer (g) | Dicarboxylic acid (g) | Carboxyl/ Glycidyl (molar ratio) | Catalyst (g) | Additive (g) | Pigment (g) |
| --- | --- | --- | --- | --- | --- | --- |
| 1 | GP-1 1,000 | Adipic acid 68 | 0.78 | Triphenyltin chloride 5 | Benzoin 3.0 "Modaflow"*1 5.0 | Rutile-type titanium dioxide 300 |
| 2 | GP-2 1,000 | " 30 | 1.10 | " | — | " |
| 3 | GP-3 1,000 | Sebacic acid 91 | 0.90 | " | — | " |
| 4 | GP-4 1,000 | " 129 | 0.65 | " | — | " |
| 5 | GP-5 1,000 | " 136 | 0.90 | Trimethyl- benzyl ammonium bromide 5 | Polylauryl acrylate 10 | " |
| 6 | GP-6 1,000 | Dodecanedioic acid 181 | 0.90 | " | " | " |
| 7 | GP-7 1,000 | Dodecanedioic acid 135 | 0.75 | Trimethylbenzyl ammonium bromide 5 | "Epikote 1001"*2 20 "Modaflow" 5 | Rutile-type titanium dioxide 300 |
| 8 | GP-8 1,000 | " 164 | 0.90 | " | "Modaflow" 10 | Phthalo- cyanine blue 300 |
| 9 | GP-9 1,000 | Azelaic acid 136 | 0.90 | Dibutyltin laurate 7 | " | " Rutile-type |

Table 4-continued

| Comp. No. | Graft copolymer (g) | Dicarboxylic acid (g) | Carboxyl/ Glycidyl (molar ratio) | Catalyst (g) | Additive (g) | Pigment (g) |
|---|---|---|---|---|---|---|
| 10 | GP-10 1,000 | Adipic acid 106 | 0.90 | " | " | titanium dioxide 300 |
| 11 | GP-11 1,000 | Sebacic acid 130 | 0.90 | " | " | " |
| 12 | GP-12 1,000 | " 129 | 0.90 | " | " | " |
| 13 | GP-13 1,000 | Sebacic acid 22 | 1.0 | Dibutyltin laurate 7 | "Modaflow" 10 | Rutile-type titanium dioxide 300 |
| 14 | GP-14 1,000 | " 251 | 0.8 | " | " | " |
| 15 | GP-15 1,000 | " 143 | 0.9 | " | " | " |
| 16 | GP-16 1,000 | " " | 0.9 | " | " | " |
| 17 | GP-17 1,000 | " " | 0.9 | " | " | " |
| 18 | GP-18 1,000 | " " | 0.9 | " | " | " |
| 19 | GP-1 1,000 | " 54 | 0.45 | " | " | " |
| 20 | GP-1 1,000 | Sebacic acid 159 | 1.32 | Dibutyltin laurate 7 | "Modaflow" 10 | Rutile-type titanium dioxide 300 |
| 21 | GP-7 1,000 | Dodecanedioic acid 135 | 0.75 | " | " | " |
| 22 | GP-19 1,000 | Azelaic acid 136 | 0.90 | " | " | " |

Note:
[1]"Modaflow": Trade mark, flowing agent of Monsanto Chemical Co., U.S.A.
[2]"Epikote": Trade mark, epoxy resin of Shell Chemical Co., Great Britain.

Coating compositions are tested with the results given in Tables 5 and 6.

ing point (No. 17). The latter four compositions are also inferior in resistance to gasoline.

Table 6

| Comp. No. | Resistance to gasoline | 60° Specular gloss | Impact resistance (500 g × ½ φ inch) | Erichsen test (mm) | Flexural strength | Surface smoothness | Blocking resistance (40° C, 7 days) |
|---|---|---|---|---|---|---|---|
| 1 | H → HB | — | >50 | >7 | Good | Good | Good |
| 2 | H → HB | — | 50 | 7 | " | " | " |
| 3 | 2H → H | — | 50 | 7 | " | " | " |
| 4 | 2H → H | — | 50 | 7 | " | " | " |
| 5 | 2H → HB | — | 50 | 7 | " | " | " |
| 6 | 2H → H | — | 10 | 1.5 | Poor | Slightly poor | " |
| 7 | 2H → H | — | 50 | 7 | Good | Good | " |
| 8 | 2H → H | — | 50 | 7 | " | " | " |
| 9 | H → HB | — | >50 | 7 | " | " | " |
| 11 | 2H → H | — | 15 | 2.5 | Poor | Poor | " |
| 13 | HB → <6B | — | 10 | 1.0 | " | Good | " |
| 14 | 3H → H | — | 35 | 3.5 | " | Poor | " |
| 15 | H → 2B | — | 20 | 2.0 | " | Good | Poor |
| 16 | 3H → H | — | 50 | 7 | Good | Poor | Good |
| 18 | 3H → H | — | 20 | 2.5 | Poor | " | " |
| 19 | H → <6B | — | 15 | 1.0 | " | Good | " |
| 20 | 2H → H | — | 20 | 1.5 | " | Poor | " |
| 21 | 2H → H | 98 | 50 | 7 | Good | Good | " |

Table 5

| Comp. No. | Blocking resistance 30° C | Blocking resistance 40° C | Resistance to gasoline |
|---|---|---|---|
| 5 | Good | Good | 2H → HB |
| 10 | Partially blocked | Blocked | H → B |
| 12 | " | " | H → 2B |
| 15 | Blocked | " | H → 2B |
| 17 | " | " | HB → 6B |

The results indicate that whereas the composition of this invention (Composition No. 5) exhibits good blocking resistance, Compositions Nos. 10, 12, 15 and 17 have very low blocking resistance because of excess polyester content (No. 10), high molecular weight of polyester (No. 12), exceedingly small molecular weight of the graft copolymer (No. 15) and exceptionally low soften- Coatings are tested with the results given in Table 7 below.

Table 7

| Composition No. | Flexural strength | Adhesion |
|---|---|---|
| 9 | Good | Good |
| 22 | Poor | Poor |

Test methods

1. Blocking resistance:

The composition is maintained at 40 ± 0.5° C or 30 ± 0.5° C for 7 days while being subjected to a load of 30 g/cm² and is thereafter inspected. When found unchanged and free of blocking, the specimen is evaluated as "good".

2. Resistance to gasoline:

The test panel is immersed in gasoline (trade mark: "Silver Gasoline", product of Nippon Oil Co., Ltd., Japan) at 20° C for 24 hours, and the immersed portion is thereafter tested for pencil hardness according to the method of JIS K 5400, 6, 14. The result is indicated in terms of the change from the hardness before immersion to the hardness after immersion, for example as "2H → HB". The smaller the change, the better is the resistance to gasoline.

3. Specular gloss:

Determined according to JIS K 5400, 6, 7.

4. Flexural strength:

The test panel is bent, coated surface up, over a 10-mm diameter round bar through an angle of 90° in 1 second, and the coating is inspected for cracking. When the coating cracks, the specimen is evaluated as "poor". The test is conducted at 20° C.

5. Adhesion:

The test panel is immersed in boiling water for 2 hours, then allowed to stand in air at 20° C for 1 hour, and the coating is cross-cut to the surface of the substrate. A cellophane tape is adhered to the cross-cut portion and then peeled off quickly. If the coating is peeled off, the composition is evaluated as "poor".

6. Softening point:

Determined according to ring-and-ball method (JIS K 2513).

7. Impact resistance:

After leaving the coated plate to stand in a constant temperature and constant humidity chamber at a temperature of 20 ± 1° C and a humidity of 75% for 1 hour, the following test is conducted in the same chamber. A bearer and a center of impact of prescribed sizes (½ inch in diameter) are fitted to a Du Pont impact tester and the plate is put between them, turning the coated surface of the plate upward. The prescribed weight (500 g) is dropped on the center of impact from the prescribed height and the plate is taken out, and after having been left for an hour in the room, the damage of surface is observed. The largest height (cm) of the weight entailing no cracking in the coating is determined.

8. Erichsen test:

The coated plate is placed in a constant temperature and humidity chamber kept at 20° C and a humidity of 75% for one hour. Thereafter, the plate is set on Erichsen testing machine with the coating positioned outside. A punch having a radius of 10 mm is pushed outward predetermined distances in contact with the rear face of the plate at as uniform a speed as possible of about 0.1 mm/sec. The pushed out portion of the plate is checked by the naked eye for cracking or peeling immediately after pushing out to determine the maximum distance (mm) of stroke of the punch causing no changes on the coating.

9. Surface smoothness:

Determined with the naked eye.

What we claim is:

1. A thermosetting powder coating composition which comprises:
    A. a functional glycidyl group-containing graft copolymer of
        i. 10 to 40 percent by weight of a linear polyester having a number average molecular weight of 600 to 3,000 and containing one terminal carboxyl group and
        ii. 60 to 90 percent by weight of acrylic copolymer of
            ii-a. 6.5 to 60 percent by weight of at least one of glycidyl esters having the formula

wherein $R_1$ is hydrogen or methyl,
            ii-b. 10 to 93.5 percent by weight of at least one of acrylic monomers having the formula

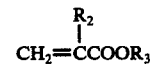

wherein $R_2$ is hydrogen or methyl and $R_3$ is alkyl having 1 to 14 carbo atoms, cyclohexyl or hydroxyalkyl having 1 to 4 carbon atoms, and
            ii-c. 0 to 65 percent by weight of additional monomers selected from the group consisting of acrylonitrile, methacrylonitrile and styrenes having the formula

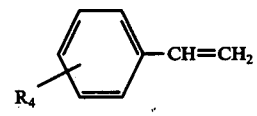

wherein $R_4$ is hydrogen or alkyl having 1 to 4 carbon atoms,
    said graft copolymer having a softening point of 70° to 110° C and a number average molecular weight of 2,000 to 30,000 and containing glycidyl group in an amount of 0.35 to 2.35 moles per kilogram of the graft copolymer; and
    B. at least one of polycarboxylic acids and anhydrides thereof in an amount of 0.6 to 1.2 moles in terms of carboxyl group per mole of the glycidyl group contained in the graft copolymer.

2. The thermosetting powder coating composition according to claim 1, in which said graft copolymer has a number average molecular weight of 4,000 to 20,000.

3. The thermosetting powder coating composition according to claim 1, in which said graft copolymer contains the linear polyester in the range of 15 to 30 percent by weight.

4. The thermosetting powder coating composition according to claim 1, in which said graft copolymer contains the glycidyl group in the range of 0.50 to 1.70 moles per kilogram of the graft copolymer.

5. The thermosetting powder coating composition according to claim 1, in which said linear polyester has a number average molecular weight of 1,000 to 2,000.

6. The thermosetting powder coating composition according to claim 1, in which said acrylic copolymer comprises 6.5 to 60 percent by weight of said glycidyl ester and 40 to 93.5 percent by weight of said acrylic monomer.

7. The thermosetting powder coating composition according to claim 6, in which said acrylic copolymer comprises 15 to 60 percent by weight of said glycidyl ester and 40 to 85 percent by weight of said acrylic monomer.

8. The thermosetting powder coating composition according to claim 1, in which said acrylic copolymer comprises 6.5 to 60 percent by weight of said glycidyl ester, at least 10 percent by weight of said acrylic monomer and up to 65 percent by weight of said additional monomer.

9. The thermosetting powder coating composition according to claim 8, in which said acrylic copolymer comprises 15 to 50 percent by weight of said glycidyl ester, 20 to 80 percent by weight of said acrylic monomer and 5 to 30 percent by weight of said additional monomer.

10. The thermosetting powder coating composition according to claim 1, in which said glycidyl ester is glycidyl acrylate.

11. The thermosetting powder coating composition according to claim 1, in which said glycidyl ester is glycidyl methacrylate.

12. The thermosetting powder coating composition according to claim 1, in which said acrylic monomer has the formula wherein $R_2$ is hydrogen or methyl and $R_3$ is alkyl having 1 to 14 carbon atoms.

13. The thermosetting powder coating composition according to claim 1, in which said acrylic monomer has the formula wherein $R_2$ is hydrogen or methyl and $R_3$ is cyclohexyl.

14. The thermosetting powder coating composition according to claim 1, in which said acrylic monomer has the formula wherein $R_2$ is hydrogen or methyl and $R_3$ is hydroxyalkyl having 1 to 4 carbon atoms.

* * * * *